July 13, 1965 H. E. STRAUB ETAL 3,194,304
VARIABLE VOLUME TERMINAL UNIT WITH REHEAT
Filed Dec. 20, 1961 3 Sheets-Sheet 1
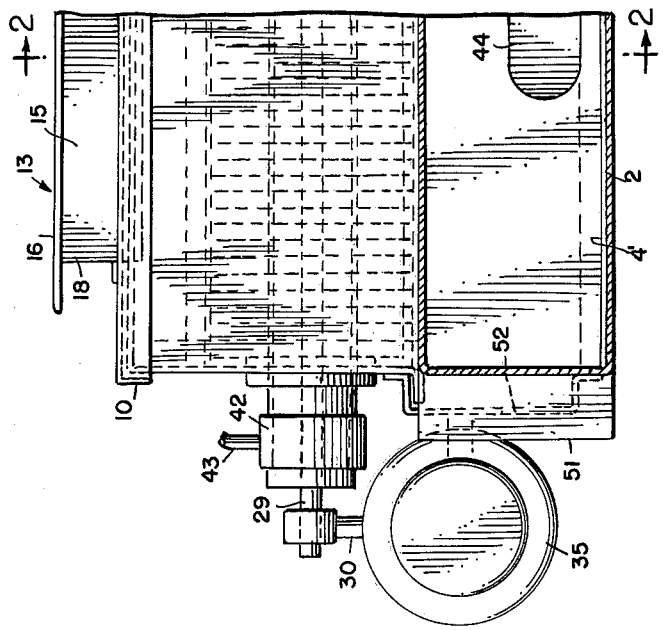
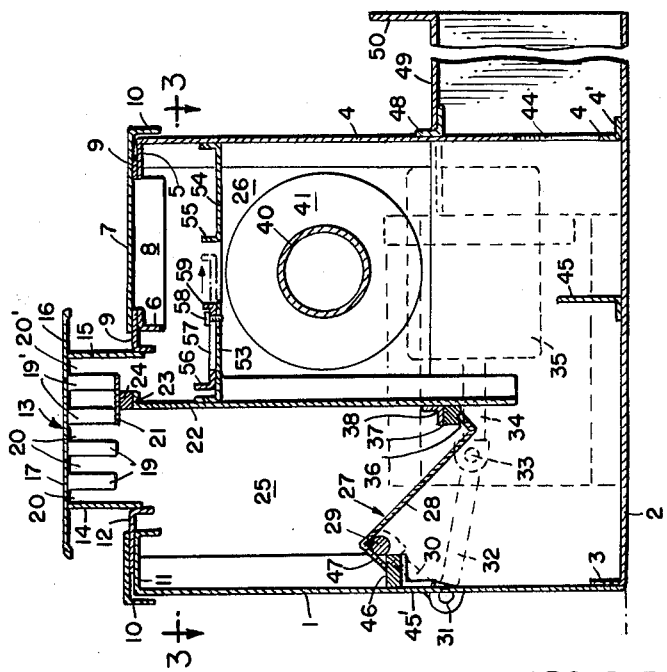
INVENTORS:
HAROLD E. STRAUB
BERWYN B. JOHNSON
BY Marshall, Johnston, Cook
& Root
ATT'YS

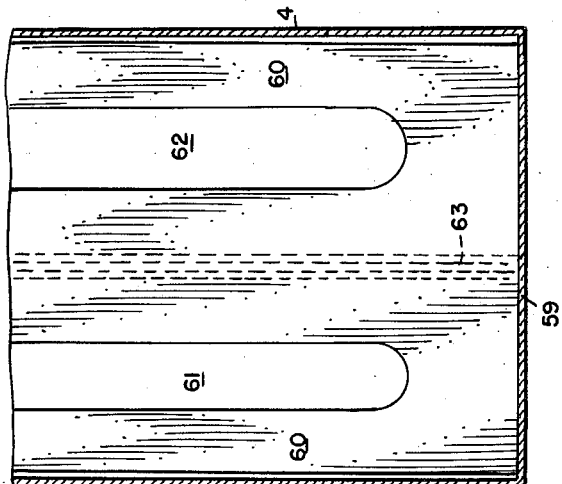
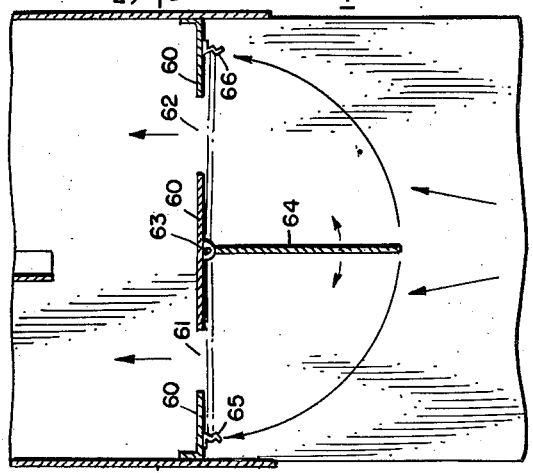
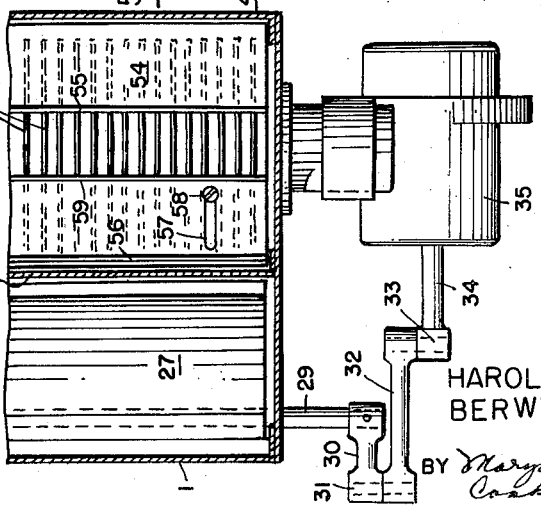
INVENTORS.
HAROLD E. STRAUB
BERWYN B. JOHNSON
ATT'YS July 13, 1965 H. E. STRAUB ETAL 3,194,304
VARIABLE VOLUME TERMINAL UNIT WITH REHEAT
Filed Dec. 20, 1961 3 Sheets-Sheet 3

INVENTORS:
HAROLD E. STRAUB
BERWYN B. JOHNSON
BY
ATT'YS

United States Patent Office 3,194,304
Patented July 13, 1965

3,194,304
VARIABLE VOLUME TERMINAL UNIT
WITH REHEAT
Harold E. Straub, Cedar Falls, and Berwyn B. Johnson, Waterloo, Iowa, assignors to Titus Manufacturing Corporation, Waterloo, Iowa, a corporation of Iowa
Filed Dec. 20, 1961, Ser. No. 161,346
5 Claims. (Cl. 165—34)

This application is a continuation-in-part of our copending application Serial No. 68,523, filed November 10, 1960, now abandoned.

This invention, in general, relates to terminal boxes or units adapted to be used as the outlet to a room for the heating system of an air conditioning and heating unit.

In a building in which the air is conditioned in a main air conditioning unit and piped through ductwork to the rooms in the building, one major problem is that of maintaining constant temperatures throughout the building or in maintaining different rooms at somewhat different temperatures to suit the comfort of various individuals. Larger buildings may have, at a given time, widely variable cooling or heating requirements in different parts of the building, e.g., sunny side vs. shady side, many-windowed side, vs. few-windowed side, wind-exposed side vs. wind-sheltered side, and the like. One proposal for achieving this goal is the supply through separate ducts of air at two different temperatures to mixing boxes. Each mixing box has a thermostatic control for a room or series of rooms. The thermostat controls an operational system, e.g., an air pressure system, which adjusts the blending or mixing of the warmer and cooler air streams in the mixing box so that the air discharged into the room or rooms is of the correct temperature with relation to the setting of the thermostat.

Such a system operates fairly well, but it is relatively complex and expensive to install. We have provided by this invention a terminal box or unit which can operate with a single temperature primary air supply and yet provide for the adjustment of the discharged air temperature into a space in response to a thermostatic control in the space.

The terminal unit of this invention has provisions for heating the primary air of an air conditioning system. In an ideal system, these units are used where primary air is supplied to the units from a central air conditioning unit which maintains the primary air at nearly constant pressure and at a controlled temperature which can be varied in accordance with the general outside solar and wind conditions and outside temperature.

Usually only a portion of the primary air can be heated in the terminal unit to satisfy the room requirements. In an ideal system for cooling, the primary air temperature and flow volume should be sufficient to at least keep the part of the building having the highest heat gain at the desired comfort temperature. The remaining parts of the building having lesser heat gains are manitained at the comfort temperature by the cool primary air plus reheat of at least part of the primary air in the reheat sections of the terminal units.

The terminal unit of our invention divides the air flowing through the terminal unit into two paths of flow. In the first path of flow, a damper, which is adjustable in accordance with the air temperature requirements for the space, controls the air flowing through this side of the terminal unit. On the other path of flow (the reheat section), there is a reheat unit which may be an electrically heated unit, a water heated fin tube, or the like. The reheat section has a smaller volume flow capacity than the maximum volume flow capacity of the dampered side of the unit.

There are several methods of operating the variable volume terminal unit. In one instance, there can be a constant minimum flow through the reheat section. In another instance, there may be used a variable volume flow through the reheat section.

With constant minimum flow through the reheat section, the air flow through this section remains nearly constant regardless of total flow through the unit. This is accomplished by proper flow control by means of an orifice or damper in the reheat section and a baffle used to direct air to the reheat section. The heating can be thermostatically controlled to stop the supply of heat to the heating unit. In the instance of a hot water heating unit, a water valve is employed to cut off water flow through the reheat coil during cooling requirements. The water valve may operate one unit or a series of coils in several units. Other means may be used to accomplish the same purpose, for example, an electric heater which is energized only when heating is called for or by other conventional means.

The minimum flow discharge from the reheat section is preferably introduced into the room at a relatively high velocity to insure the required throw during cooling since the high velocity in the section would persist regardless of the total flow. A relatively high velocity through this section may give a noticeable though unobjectionable noise. This noise, which is a constant noise, may be used to mask the change in noise of the unit which would accompany a change in the flow rate to the other section, which is controlled by the variable flow damper. Although the noise level is not high, the variation which accompanies a change in the flow rate through the dampered side of the unit may be noticeable and annoying only because of the change. A constant noise of greater magnitude, which is given by air flow through the reheat section, is not annoying and ordinarily will be unnoticed after a short period.

In the alternative method of operation, using variable flow through the reheat section, the maximum air flow through the reheat section is equal to the minimum total flow when the variable flow damper is closed. As the variable flow damper opens to increase the total flow through the unit, the quantitative flow through the reheat section is decreased. Under this method of operation, water can be circulated through the reheat coil at all times, although the use of theromstatic controls in this instance is also feasible. The quantity of primary air by-passing the reheat section is the least at lowest primary air velocity. Here, the quantity of air discharged from the reheat section will blend with the cool air and minimize the low velocity by increasing the supply air temperature. The quantity of primary air by-passing the reheat section is at a maximum with a high supply velocity, and only a small quantity of air from the reheat section will blend with the cool air and thus give maximum cooling.

Briefly, the terminal units of this invention have several elements which cooperate in distinctive fashion to give the above air flow characteristics. The terminal unit is divided into two air passages—one air passage through a reheat section which is not damper-controlled by a damper and which is constructed and/or adjusted to handle the minimum flow of air required for the unit. The other section, which is capable of handling a much larger volume of air, has a damper adapted to be controlled by a thermostatic unit which opens the damper to the extend required by the cooling requirements of the room. At the entrance of the unit, where the unit is attached to the air supply of the air conditioning system, there is an entrance orifice whose major purpose is to offer resistance which limits the maximum flow for a given supply static pressure, to provide means to meter flow by measuring velocity pressure within the unit, and to control the path of flow which will help produce either a constant or variable flow through the reheat section. This orifice may be a fixed opening or it may be made adjustable to account for various desired flow rates with various available pressures in different air conditioning systems. The positioning of the orifice with reference to a baffle on the bottom wall of the unit has a bearing upon the direction of air into the reheat section. By locating the orifice close to the bottom of the unit, the air is directed into the reheat section. Constant total pressure then is available to maintain constant flow to the reheat section regardless of the total unit flow. In the case of a bottom feed unit, two openings are provided, one below the reheat section and the other below the dampered control section. One or the other of the openings is closed off to provide constant flow through the reheat section or variable flow through the same section in a manner hereinafter described in greater detail. Still further there may be provided a double orifice at the entrance, one of which is fixed for flow measurement and the other of which is adjustable for volume adjustment of the desired maximum flow through the unit.

In the case of a unit having a feed opening at the side adjacent to the bottom of the rear of the unit, a baffle plate positioned vertically on the bottom wall of the unit can be used to deflect the air from the entrance orifice up into the reheat section. The total pressure then is nearly constant on the reheat section regardless of the total flow of the unit and produces nearly constant flow through this section regardless of the amount of total flow of air through the unit. At low volume air flow through the unit there is a high static pressure while at high air flow volume through the unit, there is a low static pressure but high velocity pressure. A baffle plate can also be used to control the amount of air flow through the reheat section to provide an amount of air flow giving maximum efficiency of the heating coil.

Another important part in our terminal unit is the variable volume damper which is located in the dampered section of the side of the unit adapted for maximum flow. The function of the variable damper is to regulate total flow through the terminal unit in response to thermostatic control in the room from a minimum when the damper is closed to a maximum when the damper is fully open. The damper's location on this side of the unit adapts it to work in conjunction with the air flow path, the baffle position on the bottom of the unit beneath the reheat section, and the entrance orifice to provide a relationship wherein the linear travel of the damper produces a nearly linear dampering action.

The reheat section contains an orifice, preferably located on the downwind side of the heating unit, which regulates the minimum flow of air through the reheat section. This reheat orifice preferably is adjustable to adapt the unit for various requirements. The adjustable orifice also can be advantageous in preference to a fixed orifice in that the noise of the unit produced in the reheat section can be controlled or adjusted to the desired level by controlling the size of the orfice in the reheat section. The adjustable orifice may also be used to control air flow over the heating coil for maximum coil efficiency.

Specific embodiments of the invention are illustrated in the drawing wherein:

FIG. 1 is a partial rear elevation of one embodiment of the invention;

FIG. 2 is a cross-sectional view in side elevation taken on section 2—2 of FIG. 1;

FIG. 3 is a partial top plan view, with the cover section removed, of the embodiment of FIG. 1;

FIG. 4 is a cross-section in side elevation of a partial view of another embodiment of the invention showing construction utilizing a bottom feed arrangement;

FIG. 5 is a section taken on line 5—5 of FIG. 4; and

Figure 6:
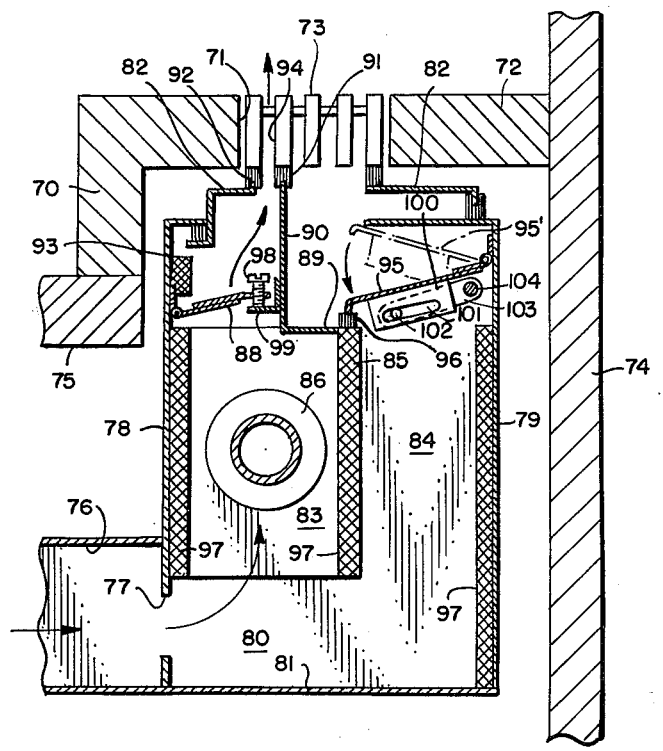
FIG. 6 is a cross-sectional view in side elevation of a still further embodiment of the invention.

Referring to the drawings, the terminal unit of FIGS. 1–3 comprises a front, sheet metal panel 1 with a bottom sheet metal panel 2 attached to the front sheet metal panal 1 at the front flange portion 3. The terminal box or unit also has a rear panel 4 attached by means of a bent lip 4' to the bottom panel 2. At the top of the rear panel 4 is a 90° bend giving an upper panel section 5 with a downwardly depending flange 6. The top of this segment of the unit is covered by a cover panel 7. The cover panel 7 has an opening for a purpose later described. The cover panel 7 is held on the unit by one or more locking tabs having a portion underlying the cover panel 7 adjacent flange portion 6. A sealing gasket 9 is used to seal the rear or right hand segment, as shown in FIG. 1, of the upper panel 7 against air leakage. The upper panel 7 has a peripheral flange 10 extending downwardly about the periphery of the terminal unit. The front or left hand segment, as seen in FIG. 1, of the upper panel 7 has a flat, segment 11 formed by an angular bend of the front panel 1. A gasket 12 is inserted between the segment 11 and cover panel 7 for sealing this side of the unit against air leakage.

Within the opening in the upper panel 7 is mounted a grille unit 13. The grille unit has front and rear walls 14 and 15, respectively, and an upper panel 16 having an opening 17. The remainder of the grille unit consists of the side walls 18 and vanes 19 and 19' forming air passages 20 and 20'. The bottoms of the two vanes 19' have a cover plate 21 extending thereacross to block off air passage in the space between the vanes 19'. In conjunction with the central, vertical divider wall 22 with its flange 23 and gasket 24, the plate 21 divides the terminal unit into two air flow segments. These segments are the damper controlled segment 25 and the reheat section 26. The damper controlled section 25 has a variable volume damper 27, comprising a damper plate 28, mounted on a pivotable shaft 29 rotatably journalled in the terminal unit. The pivotable shaft 29 is rigidly connected with crank arm 30, which in turn is connected by pivotal joint 31 to toggle 32. The toggle 32 in turn is connected by a pivotal joint 33 to piston rod 34 of a piston type air motor 35 of conventional construction and has a piston movable longitudinally in the cylinder in response to air pressure on either side of the piston.

The air motor is connected in the air conditioning system through a pressure line which supplies pressure to the air motor in response to a thermostatic control in the room or area. The damper is opened and closed through the linkage previously described in response to the degree of movement of piston of the air motor 35. Damper plate 28 has an upturned edge 36 which is adapted to abut against a gasket 37 held on the bracket 38 to provide an air-tight seal when the damper is closed. A similar bracket 45' with gasket 46 is adapted to provide the same function with the bent edge 47 of the damper plate 28.

The heating unit for the air in the reheat section in the embodiments shown in the drawing is provided by a hot water fin tube 40 containing fins 41. The heating tube 40 has, in some instances, a solenoid valve 42 electrically connected by wires 43 to a thermostatic control unit. With this arrangement the reheat coil functions only when heating of the supplied air is required. In other embodiments of the invention, the valve 42 may be omitted or may be placed elsewhere in the water supply system for controlling a group of reheat coils in a plurality of terminal boxes.

In the embodiments of FIGS. 1 to 3, the restricted opening through which air enters the terminal box is designated by the numeral 44. This opening 44 may be of a fixed size as shown in the drawing or it may have a plate slidable thereover so that the opening can be adjusted in size in accordance with the amount of air to be delivered by the system through the terminal unit. The opening 44 is located near the bottom of the rear panel 4. With the omission of the baffle plate 45 positioned on the bottom wall below the reheat section, the terminal box of FIGS. 1 to 3 has a variable volume feed through the reheat section. The variable volume flow through the reheat section is changeable in accordance with the amount of opening of the volume control damper 27. As more air is permitted to flow through the section controlled by the damper 27, less air flows through the reheat section 26.

Where substantially constant volume flow through the reheat section is desired regardless of total flow through the unit, the baffle plate 45 is provided on the bottom wall of the terminal unit below the reheat section 26. This baffle causes the air path to turn upwardly so that the primary air stream introduced through the aperture 44 is directed into the reheat section 26. As the damper 28 opens, the terminal box can handle additional quantities of air. The additional quantities of air flow through the section 25 of the terminal unit—the section 25 handling substantially all of the increased flow of air through the terminal unit upon opening of the damper. In this embodiment of the invention, the quantity flow through the reheat section 26 remains substantially constant regardless of the degree to which the baffle 28 is open.

The rear panel 4 has a connecting neck surrounding the opening 44 for attachment of the terminal unit to the main duct work of the air conditioning system. An angle 48 is attached to the rear face of the rear panel 4 and protrudes outwardly therefrom above the aperture 44. A three-sided channel 49 is mounted on the bracket 48 and connected with the outwardly-extending portion of the bottom wall to provide a neck section adapted to conduct air from the air conditioning system to the aperture 44 of the terminal box. The neck 49 has outwardly-extending side tabs 51 and an upper tab 50. Mounted on one of the side walls of the terminal box is a bracket 52 upon which is mounted the air motor 35.

The quantity of air flow through the reheat section 26 is controlled by an adjustable orifice positioned in the reheat section. This orifice, which is positioned on the downwind side of the coil 40, may be a fixed orifice or may be adjustable as shown in the embodiment of FIGS. 1 to 3.

The adjustable orifice is made up from plates 53 and 54 extending inwardly toward each other from walls 22 and 4, respectively. Plate 54 has a right angle bend 55 forming one side of the orifice in the walls 53 and 54.

The adjustable orifice is provided by a second plate 56 slidably mounted on the plate 53. The plate 56 has a plurality of transversely-directed slots 57 through which extend screws 58 threadably secured in the plate 53. These screws and slots form the guide means for a sliding action for the plate 56 on the plate 53, and the screws may also be tightened down to hold the plate 56 in the adjusted position desired. One edge of the plate 56 is an angle bend 59 which serves as the opposing wall forming the orifice for the reheat section 26.

The details for the upper portion of the terminal unit for the embodiment shown in FIG. 4 are essentially the same as the details in the unit shown in FIGS. 1 to 3. For this reason, the upper portion of the terminal unit has been omitted in FIG. 4 because it would be essentially a duplication of that shown in FIGS. 1 to 3. The modification of FIG. 4, however, differs from the modification of FIGS. 1 to 3 in that the feed to the terminal unit is through the bottom wall of the unit rather than through the side wall as shown in FIGS. 1 to 3. In the embodiment of FIG. 4 the bottom wall 60 of the unit is made up of a panel attached to the side walls 59, front wall 1 and the rear wall 4. This panel has an aperture 61 below the damper controlled section 25 and another aperture 62 below the reheat section 26. Hinged to the bottom wall of the bottom panel 63 is a cover plate 64 which can be swung in either direction to cover one or the other of the openings 61 and 62. The cover plate is held in covering relation to the holes 61 and 62 by spring clips 65 and 66, respectively. With the cover plate covering the aperture 61 below the damper control section 25, the air is supplied to the unit through the aperture 62 below the reheat section 26. In this position of the cover plate 64, the unit has substantially constant volume flow through the reheat section regardless of the total flow of the unit.

With the cover plate 64 covering the opening 62, the air is fed through the opening 61 below the variable volume damper controlled section 25. In this position of the cover plate the flow through the reheat section is a variable flow which varies in accordance with the total flow through the unit.

When both of the openings 61 and 62 are uncovered, the cover plate hanging downwardly in the position shown in FIG. 4, there is a variable flow through the reheat section which does not vary to the extent that it would if the aperture 61 were open and the aperture 62 closed.

The embodiment of FIG. 6 is a further development of the invention. The variable volume reheat unit of this embodiment operates in a similar manner to the embodiments previously described. The unit is shown mounted in a 3″ floor sill 70 having a rectangular opening 71 in the sill plate 72. The grille 73 extends lengthwise across the opening 71.

The variable volume reheat unit is mounted in the building structure adjacent a wall 74 with most of the unit below the level of the floor 75. Primary air is supplied to the unit through the duct 76 below floor 75 and enters the unit through a restricted opening 77 in the side wall 78 of the variable volume reheat unit.

The variable volume reheat unit is essentially a six-sided enclosure with side walls 78, 79, end walls 80, bottom wall 81 and a top wall 82 having an opening registering with the grille 73. The unit is divided into a pair of vertical air passages 83, 84 by a vertical, divider wall 85 extending between the end walls 80 of the unit substantially parallel to the side walls. The bottom of wall 85 is above the bottom wall 81, and the top of the wall 85 is below the top wall 82 of the unit.

The passage 83 is the reheat section of the unit. It has a fin tube heater 86 which will reheat the primary air supplied through duct 76. The maximum flow through the reheat coil is adjustably controlled by the manually-settable damper 88 positioned in the reheat side of the unit on the downwind side of the fin tube heater 86. The damper 88 is mounted on the wall 78.

The reheat air stream is maintained as a separate stream from the air flowing through the passage 84 by the second vertical wall 90 and the third wall 89 connecting the top of wall 85 and bottom of wall 90, both of which walls 89 and 90 extend longitudinally across the unit. The upper end of the wall 90 has a gasket 91 between it and the bottom edge of a grille vane. A similar gasket 92 is placed between the upper wall 82 and the bottom edge of an adjacent grille vane. The air stream through the reheat section thus flows through the passage 83, the damper 88, the passage 93 and is discharged through the grille passage 94.

The air flow through passage 84 is under the control of the motor operated damper 95 which is pivotally mounted on the wall 79 of the unit. When the edge of the damper 95 rests on the gasket 96 on the top of wall 89, the damper 95 cuts off completely the air flow through the passage 84. This position is used when the room or zone thermostat calls for reheat air, whereby all air is supplied to the room via the reheat section of the unit. As the damper opens in response to a thermostat call for cooling air, the total air flow through the unit increases, with total flow reaching its maximum with the damper in its fully open position 95'. The damper in the open position deflects air from its bottom surface toward the discharge opening and provides a volume increase of air flow which is nearly directly proportional to the proportion of the distance of movement of the damper between its closed and open positions.

With damper 95 open, air flows through passages 83, 93 and 84, and it discharges into the room through all passages in the grille. The inner walls of the unit may have insulation 97 attached thereto.

In addition to the parts shown in FIG. 6, the variable volume unit utilizes in its operation a thermostat, preferably a pneumatic thermostat, a solenoid valve in the hot water line for the fin tube, and an electric or pneumatic damper motor for damper 95.

When the thermostat is calling for full heating (0 p.s.i. from thermostat), the water valve is open and the by-pass damper is closed. The flow rate then is a minimum and all the air is flowing across the reheat coil. The required minimum flow over the heating coil may be adjusted from the face of the grille by positioning the reheat damper. Flow is through only ¼ of the grille.

As the thermostat calls for reduced heating (0–7 p.s.i.), the water valve closes and the by-pass damper remains closed. When the water valve and the by-pass damper are closed, the flow rate is still at a minimum but is now providing minimum cooling. When the thermostat calls for cooling (7–13 p.s.i.), the pneumatic motor begins opening the by-pass damper and more air is then allowed to flow through the unit until the damper is full open and maximum flow and cooling is reached.

To provide good regulation of the flow and heating and cooling the pressure and primary air temperature at the entrance to the unit should be relatively constant. The pressure regulation may be accomplished by a damper in the primary air supply which feeds a number of units.

One means for regulating the size of the opening of damper 88 is shown in FIG. 6 wherein a screw 98 is threaded in a tapped hole in the damper plate. The end of the screw rests on the horizontal leg of a bracket 99 attached to and extending across the wall 90. The size of the opening between the horizontal leg of bracket 99 and damper 88 may be adjusted by setting screw 98 in the desired position.

The connection between the damper 95 and the motor which operates the damper may be any suitable mechanical connection. In the illustrated embodiment, the damper 95 has at one end a depending plate 100 at a right angle to the damper plate. It may be a downwardly bent ear on the edge of the damper plate or may be a separate piece attached to the damper plate. The plate 100 has an elongated slot 101 in which slidably rides a pin 102 attached to and extending outwardly from the crank arm 103 on rotatable shaft 104. The shaft 104 is the shaft of the motor, e.g., an air motor (not shown in FIG. 6), which operates the damper 95. The slot and pin connection 101, 102 provides the linkage between the damper 95 and crank arm 103 to impart a pivotal movement to the damper upon rotation of the motor shaft 104.

The foregoing description of the invention and the specific embodiments thereof set forth the principles for achieving the basic purposes and objectives of the invention. The illustrated embodiments are provided by way of illustrations of preferred modes for achieving the objectives and purposes of the invention. The invention is not limited to these embodiments, however, and contemplates any and all embodiments within the scope of the invention as defined by the appended claims.

The invention is hereby claimed as follows:

1. A terminal unit for air conditioning systems comprising walls providing a hollow chamber, a restricted opening in one of the walls of said chamber adapted for supplying air to said chamber, an opening in another of the walls in said chamber through which air is adapted to be discharged, divider wall means extending into said chamber from said last-mentioned opening and dividing said chamber and last-mentioned opening into two air passages, means in one of said passages for heating air passing through said passage, a damper controlling air flow through the other of said passages, and temperature-responsive, power-operated means for opening and closing said damper to regulate the quantity of air passing through said damper-controlled passage, said opening through which said air is adapted to be discharged being provided with a grille composed of spaced, parallel bars having a plurality of air passages therebetween, and said divider wall means and said grille being connected at a position on said grille to provide a substantially lesser air discharge area through said grille from said passage containing said means for heating the air as compared with the discharge area through said grille from said passage containing said damper.

2. A terminal unit for air distributing systems comprising side, end, bottom and top walls providing a hollow chamber, a restricted opening in the lower part of one of the side walls of said hollow chamber through which is supplied air to said chamber, a first vertical wall substantially parallel to said one of said side walls, said vertical wall terminating above said bottom wall and below said top wall of said hollow chamber, a second vertical wall above, substantially parallel to and offset with respect to said first vertical wall, a third wall connecting the top of said first vertical wall and the bottom of said second vertical wall, said top wall having an opening therein and the top of said second vertical wall terminating substantially at said opening, said first, second and third walls extending laterally across said chamber whereby said hollow chamber is divided into two air passages extending from a position above said bottom wall to said last-mentioned opening, air-heating means positioned in one of said passages beneath said third wall, and a damper pivotally mounted on a side wall of said hollow chamber in the other of said passages with its free end adapted to seat on top of said third wall and close off air flow through the other of said passages.

3. A terminal unit as claimed in claim 1, a damper in said passage containing said means for heating the air, and manually-adjustable means for setting said damper in a predetermined position.

4. The combination of a building floor, a duct extending beneath said floor, said floor having an opening therein, a terminal box mounted in said opening, said terminal box comprising a top wall, a bottom wall and side walls defining a substantially rectangular, hollow enclosure, the lower portion of said enclosure having an air passage communicating with said duct, a vertical wall in said hollow enclosure dividing said enclosure into two air passages, said top wall of said enclosure having an elongated air discharge opening therein, the upper edge of said vertical wall being in proximity to said discharge opening whereby air flowing through said air passages is discharged from said enclosure through said discharge opening, the lower edge of said vertical wall being spaced from said bottom wall, means in one of said passages for heating air flowing therethrough, a damper regulating air flow through the other of said passages, said damper adapted when closed to shut off air flow through said passage, said opening in said top wall being provided with a discharge grille having a plurality of air passages, and said divider wall means and said grille being connected at a position on said grille to provide a substantially lesser air discharge area through said grille from said passage containing said means for heating the air as compared with the discharge area through said grille from said passage containing said damper, and means for opening and closing said damper.

5. The combination as claimed in claim 4, and temperature-responsive, power-operated means for opening and closing said damper to regulate the quantity of air passing through said damper-controlled passage.

References Cited by the Examiner

UNITED STATES PATENTS

| | | | |
|---|---|---|---|
| 699,352 | 5/02 | Titus | 236—13 |
| 1,780,589 | 11/30 | Hendix. | |
| 1,849,061 | 3/32 | Anderson | 55—222 |
| 1,874,940 | 8/32 | Dwyer | 165—69 |
| 2,007,102 | 7/35 | Wallace | 165—126 |
| 2,043,561 | 6/36 | Sims | 98—39 |
| 2,076,399 | 4/37 | Carson | 165—124 |
| 2,093,306 | 9/37 | Carson | 237—1 |
| 2,814,446 | 11/57 | Phillips et al. | 236—13 |
| 2,869,832 | 1/59 | McElgin | 165—55 |

FOREIGN PATENTS 379,663 /32 Great Britain.

CHARLES SUKALO, *Primary Examiner*.
ALDEN D. STEWART, *Examiner*.